United States Patent
O'Toole

(10) Patent No.: US 7,139,840 B1
(45) Date of Patent: Nov. 21, 2006

(54) METHODS AND APPARATUS FOR PROVIDING MULTIPLE SERVER ADDRESS TRANSLATION

(75) Inventor: James W. O'Toole, Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 619 days.

(21) Appl. No.: 10/172,173

(22) Filed: Jun. 14, 2002

(51) Int. Cl.
  *G06F 15/16* (2006.01)
(52) U.S. Cl. .................. 709/245; 709/249; 709/227
(58) Field of Classification Search ........ 709/227–228, 709/245, 203, 249
  See application file for complete search history.

(56) References Cited

U.S. PATENT DOCUMENTS

| | | | | |
|---|---|---|---|---|
| 6,324,582 B1 * | 11/2001 | Sridhar et al. | ............. | 709/230 |
| 6,480,508 B1 * | 11/2002 | Mwikalo et al. | ............. | 370/475 |
| 6,779,035 B1 * | 8/2004 | Gbadegesin | ............. | 709/228 |
| 6,993,595 B1 * | 1/2006 | Luptowski et al. | ......... | 709/245 |
| 2002/0114322 A1 * | 8/2002 | Xu et al. | ............. | 370/352 |
| 2002/0129165 A1 * | 9/2002 | Dingsor et al. | ............. | 709/246 |
| 2003/0212795 A1 * | 11/2003 | Harris et al. | ............. | 709/227 |
| 2004/0044777 A1 * | 3/2004 | Alkhatib et al. | ............. | 709/228 |

* cited by examiner

*Primary Examiner*—Abdullahi Salad
(74) *Attorney, Agent, or Firm*—Chapin IP Law, LLC; Barry W. Chapin, Esq.

(57) ABSTRACT

The invention is directed to techniques for coupling a first network and a second network including a method for processing messages to be transferred from a first network to a second network. The method comprising the steps of receiving a message to be transferred between a client device coupled to the first network and a server device coupled to the second network. A first data communications device determines that the message is associated with a connection that is related to a second data communications device also coupling the first network and the second network, wherein the first data communications device and the second data communications device share a network address on the first network. The first data communications device processes the message to maintain the connection to the client device on the first network and to at least one server device on the second network.

29 Claims, 7 Drawing Sheets

METHODS AND APPARATUS FOR PROVIDING MULTIPLE SERVER ADDRESS TRANSLATION

BACKGROUND OF THE INVENTION

Computer networks such as the Internet use various techniques and mechanisms for routing requested packets over data links in response to content requests. Such traffic may be routed over different network paths and/or may access different servers in order to fulfill the content requests. Various types of network devices are employed which have the ability to re-route network traffic, as needed, between different alternative servers that may each hold desired content, such as, for example, duplicate or cache content servers.

Network Address Translation (NAT) is a method for translating a first network address, used in a packet being transferred from one network location on a first network that uses a first set of addresses, to a second address usable on a second network that uses a second set of addresses. For example, one use of NAT is to translate the destination address of a packet, which a LAN receives from the Internet, from the publicly known address of one NAT device coupling the LAN to the Internet to an address of any of multiple devices, such as content servers, existing in the LAN whose addresses are not publicly known, to which the packet must travel. After changing the address to a new address, the NAT device can forward the packet onto the LAN using the translated address.

In some cases, a TCP port number of a packet may provide information used by the NAT device to perform the translation of the address of the packet to the new address. As an example, if a destination computer system (e.g., a content server) on a network receives a packet requesting data and containing an address translated as described above, the destination computer system can return data packets to the NAT device (e.g., the device that changed the packet to contain the translated address). The destination computer system does so by creating response packets that reference the source address and port information within the packet header that identify the NAT device as the originating device of the original packet requesting the data. When these response packets are routed back to the NAT device, the NAT device can compare the TCP port number information to NAT table entries to determine a true destination device (i.e., the device that generated the original request) to which that packet is then forwarded.

The NAT approach is described in RFC 1631 of the Internet Engineering Task Force. The disclosure of RFC 1631, "The IP Network Address Translator (NAT)," is hereby incorporated in its entirety herein by reference.

In order to meet demand for network provided (e.g., Internet) content, multiple servers, such as web site servers, may be loaded with duplicate content and, as such, can serve as alternative sources for content requested by clients. Different conventional techniques may be employed to forward an initial request for the content to the different servers containing the content. For example, in one case, a content server, to which a request is originally directed, may cause a client redirection to a new server by returning a redirection command to the client generating the original request along with an alternative site name or address. This causes the originating client to re-execute its request to the server represented by the new site (i.e., the alternative) name or address.

In another case, requests for content may be directed to a device that has been configured to be aware of alternative servers that have a duplicate store of the requested content and provide the site name or address of the alternative servers to the client, here again, along with a command for the client to redirect its request to the alternative server having the duplicate content. Such devices may operate in conjunction with the existing system that provides domain name services to Internet users, for example. In these examples, the traffic may be rerouted for any of a variety of traffic-related reasons such as avoiding attempting to provide content from a server that is over-burdened by too many requests, avoiding servers that have been taken out of service, or for the purpose of conducting maintenance and for spreading out workload among multiple servers, or for other reasons.

SUMMARY OF THE INVENTION

Unfortunately there are shortcomings to the conventional mechanisms and techniques for providing distributed server access. In conventional systems, content may be duplicated over multiple server locations, each with a different network address.

As an example, a conventional web site might consist of many geographically dispersed groups of web servers, with each group coupled to the Internet with a respective load balancing device such as a content switch or router. The servers in each group might all be capable of serving duplicate content for the web site. In other words, content available from one group might also be available from another group. The separate content switches for each group might each be configured with distinct network addresses. Domain name servers that receive domain name resolution requests for the web site from clients located close to one group of servers might provide the network address of a content switch for that group of servers, while other domain name servers for other clients might provide the network address of another content switch or router that couples another group of servers for that web site to the Internet. In other words, using this conventional web site configuration, clients can access the same web site content from different network addresses of respective content switches (and corresponding groups of web servers) depending upon which group of servers is closest (in network routing terms) to the requesting client.

As another example, a client may have initiated a request to the server containing desired content, contacted the server, established a connection, and started receiving data from the server for a period of time before the connection breaks due to an occurrence such as an equipment failure of the network facilities. In turn, transmission over the network facilities may cease, resulting in transmission of the requested content to stop. Another common occurrence is for a connection to fail because a particular network facility or a server has become overburdened with traffic or processing activities thereby causing existing connections to time-out. There are many possible causes for failure of such an in-process transmission. In such cases, the connection may be broken and the transmission of content will fail.

Embodiments of the invention include mechanisms and techniques to provide data communications devices (e.g., network address translation devices) with the information needed to route traffic (e.g., Internet traffic) to and from multiple distributed server devices coupled to a network via data communications devices that share a single address (e.g., for the acquisition of requested content from a web site). For example, a client device (e.g., an Internet user requesting content using a client computer system) may send a message to obtain content which has been duplicated on two different servers devices (e.g., an exemplary configuration of server devices may be for one server device to be located on the east coast and the other server device located on the west coast). Both server devices are coupled to the Internet via respective data communication devices that are each configured to advertise the same address (e.g., Internet address). The data communications devices perform network address translation of messages (e.g., the client requests for content and the content itself as it is being returned to the requesting client) transmitted between the client and two server devices which contain duplicates of the content requested.

Upon receipt of such a request from a client device, in one embodiment of the invention, if the first data communications device receiving the message is not the data communications device primarily associated with or designated to translate and forward the message to a particular server device containing the requested content, the first data communications device receiving the request is configured to take other steps in order to ensure completion of the client request and/or non-disruption of the connection to the client device. Accordingly, in one embodiment, the first data communications device receiving the client request can tunnel the client request to an appropriate second data communications device that is associated with the message. In that case, the second data communications device receiving the tunneled message, already has whatever network translation information is necessary for translating messages so that the message is forwarded to the appropriate server device containing desired content. In this way, one of multiple data communications devices, advertising a common shared address, are able to tunnel (i.e., forward) requests through an appropriate data communications device capable of forwarding the request to a server device containing the desired content.

In another embodiment of the invention, a second data communications device may be configured to forward a connection vector that may contain, for example, network address translation information to other data communications devices (i.e., first data communications devices) in anticipation of the network address translation information (and possibly other information in the connection vector) being used by such first data communications devices to forward client requests to an appropriate server device in the event of failure of second data communications device, the server, or a change in routing conditions that results in the first data communications devices receiving client request that were originally routed to the second data communications device. Later, if a first data communications device, receiving a client request, identifies that the client request is associated with a different data communications device (i.e., a second data communications device), the first data communications device receiving the client request may use the connection vector including the network address translation information, provided earlier by the second data communications device, to forward the client request to the appropriate server device without losing or breaking the connection to the client.

In certain cases, the network address translation information may consist solely of port and address information which the data communications device uses for translating a message (e.g., the packet header of the message such as in a client request) destination address to a different address. In other cases, such as situations that involve messages that might be re-routed to another server device in midstream, the network address translation information could also include other information, such as, for example, sequence information that can be used to process a message in such a fashion that the message appears to the recipient server device as if the message was a continuation of the messages originally transmitted over the initial path. In some cases, as well, the network address translation functions may be performed by the data communications devices in combination with other management and/or record keeping functions that are incorporated into such devices in connection with processing of messages.

In cases where the first data communications device uses such "borrowed" network address translation information to process a message, in order to forward the message to a destination server device, the first data communications device may forward the message directly to the original server device, instead of tunneling the message to the second data communications device first. This method is particularly appropriate in cases when there has been a failure of the second data communications device associated with a particular original server device containing the desired content or a failure of one of the transmission paths to and/or from the second data communications device that is associated with the original server device containing the desired content.

In the case of handling a connection that is broken in midstream (i.e., so called "failover"), both in the tunneling embodiment and the embodiment of the invention in which a message is sent directly to the original server device directly from the first data communications device, the server device may continue delivery of content that was disrupted (or continue receipt of a request that may have been disrupted) from the point in the transmission where the disruption occurred. Different configurations are possible for the administration of such broken connections. In one embodiment of the invention, a first data communications device not only handles creation and/or relocating connections as required, but also uses "state" or other information to track and administer the continuation of transmissions interrupted in mid stream. In other embodiments of the invention, the first data communications device only tracks the existence of such broken connections but notifies the server device of such occurrences for appropriate handling of continuation of the transmission by the server device.

In one embodiment of the invention, the first data communications device may be pre-configured to identify when any particular message received is associated with a second data communications device, such as, for example, by use of a table identifying specific clients' IP addresses or the portions or prefixes of the IP addresses of the messages (e.g. packets) or other identification.

In an alternative embodiment, the first data communications device may depend upon information such as a connection vector with network address translation and other information provided by the second data communications device upon the establishment of earlier connections by the second data communications device. Such a connection vector may be sent to the first data communications device (e.g. by a second data communications device) prior to a message being received by the first data communications device, such as, for example, on a periodic, regularly scheduled or other basis. Such a connection vector may alternatively be sent to the first data communications device in response to a request from the first data communications device for use in processing the message.

As discussed earlier, the embodiments of the invention provide the facility of being able to access desired content from different servers using the same address. This is accomplished even in cases in which a first data communications device borrowing network address translation information may forward the message directly to the original target server device. Both the first and second data communications devices that are associated with the server device providing the requested content advertise the same address to the network. As a consequence, in the event of a connection broken in mid-stream, the client device could re-initiate a connection with relative ease using the same address to access content, even though access to the content is accomplished by transmission of the client request over a different path.

According to another embodiment of the invention, the first data communications device, upon reception of a client request, may forward the client request to a different server device which has been equipped with duplicate content. Accordingly, the messages which are steered to the new server device (i.e., which may be a server device associated with the first data communications device; it could be a server device associated with the second data communications device) containing desired content have been made to be accessible using the same address as the address that would have been used if the content had been provided by the server device originally transmitting messages using a path through the second data communications device.

As discussed earlier, the second data communications device, according to one embodiment of the invention, provides connection vector information to first data communications devices. The connection vector, in addition to providing network address translation information, may include other types of information used in the connection process such as the data state, offset information, content information and the identity of a second server device. The data state information provides a first data communications device with the information to enable the first data communications device to know at what point to continue delivery of file whose transmission is already in-progress (e.g., certain files such as video, audio, various streaming and other files, etc.) which may have been interrupted during transmission through the second data communications device. Continuation of the file transmission may be provided from either the server device that originally provided the earlier part of the file but accessed via a different first data communications device, may be provided from the same server device accessed via tunneling through the second data communications device or may be provided from a different server device.

In certain situations, a data communications device will transmit a "spoof" of a connection acknowledgement to a client in order to cause the client to forward the universal resource locator (i.e., URL) to the server device (i.e., even though connection had not actually been established) so that the data communications device can analyze and use the URL to make routing decisions. Accordingly, in one embodiment of the invention, a first data communications device receives offset information from a second data communications device which identifies the offset between the initial and later message (i.e., a later message that may instead be processed via the first data communications device) sequence numbers following a client "spoof" by the second data communications device. The first data communications device uses the offset information to adjust the sequence numbers of the succeeding messages that the first data communications device continues to forward so that the messages appears as they would if they were being sent through the original data communications device.

Other information provided by the connection vector includes content information such as the original URL or other content information that can be analyzed by the first data communications device for use in making routing decisions. In another embodiment of the invention, the connection vector may also contain information identifying the identity of a server device for use by the first data communications device to identify a server device associated with the second data communications device to which the first data communications device can forward messages.

In one embodiment, a first data communications device couples a first network and a second network including a method for processing messages to be transferred from a first network to a second network. A first data communications device receives a message to be transferred between a client device coupled to the first network and a server device coupled to the second network. The first data communications device determines that the message is associated with a connection that is related to a second data communications device also coupling the first network and the second network. The first data communications device and the second data communications device share a network address on the first network. It then processes the message to maintain the connection to the client device on the first network and to at least one server device on the second network.

The various embodiments of the invention provide access to content stored on multiple servers sharing the same address (e.g., such as an IP address). By doing so, embodiments of the invention help to make it feasible for client devices to access desired content with little or no processing or administrative required of the client device. In particular, in the case of failed network facilities and/or server devices, failover processes are simplified.

In another embodiment, the first data communications device maintains a set of associations of client devices related to the first data communications device and identifies that the message is associated with a client device not maintained in the set of associations. Embodiments of the invention use the set of associations of client devices related to a first data communications device to identify the manner in which the first data communications device will process (e.g., forward) messages that it receives.

In yet another embodiment, the first data communications device maintains a set of metric indications indicating counts of past messages processed for the connection by the first and second data communications devices and identifies, based on the set of metric indications, that the second data communications device maintains the connection associated with the message. The metric indications which may have been received from a second data communications device may have been sent to the first data communications device either at the time that the second communications device had received a similar earlier message or at some other time. The first data communications device uses the metric indications to identify whether it must obtain network address translation information to process messages that it receives.

In one embodiment, the first data communications device transfers the message to the second data communications device such that the second data communications device forwards the message to the server device coupled to the second network. If access to the second data communications device fails for reasons such as failure of network facilities providing access to the second data communications device or other causes, the first data communications device, upon receipt of a message, may tunnel the message to the second data communications device so that the message will be forwarded to the server device associated with the second data communications device to which the message might otherwise have been transmitted.

In yet another embodiment, wherein the second data communications device maintains the connection between the client device and a second server device coupled to the second network, the first data communications device detects an inability to communicate with at least one of the second data communications device and the second server device. In response to detecting an inability to communicate with the second data communications device, the first data communications device declines to forward the message to at least one of the second data communications device and the second server device for which the inability to communicate was detected.

If the first data communications device identifies that either the second data communications device itself or network access to the second data communications device or access to the second server device is not operational, the first data communications device, in recognition that there would be no point to attempt to tunnel the message to the second data communications device or forward the message directly to the earlier-designated second server device, is able to undertake different alternatives than tunneling to either the second data communications device or the second server device.

In another embodiment, the first data communications device receives a connection vector from the second data communications device. The connection vector contains information from the second data communications device related to the connection associated with the message.

In yet another embodiment of the invention, the connection vector received from the second data communications device, is received prior to receipt of the message. Accordingly, the first data communications device is able to utilize connection vector information which may have been obtained earlier, even if the second data communications device, which would otherwise have provided the connection vector information, is inoperable, and as a consequence is unable to send the connection vector information to the first data communications device.

The connection vector, received by the first data communications device from the second data communications device, can be used by the first data communications device to process messages which the first data communications device may receive.

In one embodiment of the invention the connection vector may include at least one of: i) network address translation information used by the second data communications device to translate messages associated with the connection; ii) a data state indicating information related to a state of data transferred over the connection through the second data communications device; iii) offset information identifying an offset created during establishment of the connection through the second data communications device; iv) content information identifying a content request received from the client by the second data communications device; and v) a second server device identity indicating a second server device to which the second data communications device forwards messages associated with the connection.

Network address translation information can be used to modify header information within a message (e.g., packet) so that the message can be processed as if the message had been transmitted via the second data communications device with which the message would otherwise have been associated. Data state information provides the first data communications device with the data needed to identify a point in a file from which the first data communications device should cause transmission of such a file, that originally was started over a second data communications device, to continue transmission from the first data communications device. Offset information identifies the offset between the initial sequence number of a message received by a second server device and the sequence number of a later message sent via a first data communications device which occurs as a result of the second server device spoofing to the client device that a connection was actually set up when the second data communications device first received the client request. The first data communications device will modify the sequence numbers of the later message to reflect the offset information provided by the second data communications device to the first data communications device. A second data communications device can use content information (e.g., such as a URL or other content information, etc.) as one source of information for making routing decisions. A second server device identity identifies a server device to which the first data communications device can directly transmit messages that would otherwise have been forwarded via the second data communications device.

In yet another embodiment, the first data communications device receives, in the connection vector, network address translation information used by the second data communications device to translate messages associated with the connection. It establishes a connection state in the first data communications device, based on the network address translation information, to allow the first data communications device to forward the message to the at least one server device and forwards the message to the at least one server device using the network address translation information such that the connection over which messages are transferred between the client and the at least one server device is not disrupted and passes through the first data communications device.

The first data communications device forwards messages which it receives in such a manner that the connection which the first data communications device or the connection which may already have been established through a second data communications device but which the first data communications device later maintains as a result of a failure of the second data communications device or network paths or server devices associated with the second data communications device, as if the original connection had remained operational from the time of its initial establishment.

In yet another embodiment, wherein the second data communications device maintains the connection between the client device and a second server device which is the at least one server device, the first data communications device receives, in the connection vector, the second server device computer identity of the second server device. The first data communications device also forwards the message to the second server device.

If either the network providing access to the second data communications device or the second data communications device itself is not operational, the first data communications device is able to forward messages directly to the server device to which the second data communications device could have sent the message if the second data communications device and the network facilities to which the second data communications device is associated had been operational.

In another embodiment, wherein the second data communications device maintains the connection between the client device and a second server device the first data communications device utilizes connection vector information to identify a first server device associated with the first data communications device. The first data communications device also forwards the message to the first server device.

In lieu of forwarding the message which the first data communications device receives, either by tunneling to the second data communications device or by directly forwarding the message to a second server device to which the message would otherwise have been sent, the first data communications device may forward the message to an alternative first server device to which the first data communications device may have access.

In still another embodiment, the first data communications device analyzes content information in the connection vector. The content information identifies a content request received from the client by the second data communications device, in order to select a first server device capable of serving content associated with the content information.

The second data communications device may use content information including, for example, an actual URL provided as part of a client request or other content information in the process of making a determination where to forward a message which the first data communications device has received.

In one embodiment, the first data communications device receives a data state indicating information related to a state of data transferred over the connection through the second data communications device. The first data communications device configures the first data communications device to maintain a data state associated with the connection such that a remainder of data transferred in messages over the connection between the client and the at least one server device continues in a state through the first data communications device as if it were still being transferred through the second data communications device.

This procedure makes it possible for the first data communications device to ensure continuation of a file transfer for certain files even though transmission of the remaining portion of the file may be derived from a different source or transmitted over a different path than what originally occurred for transmission of the earlier portion of the file.

In another embodiment, wherein the at least one server is a first server device associated with the first data communications device, the second data communications device forwards the data state to the first server device such that the first server device can configure a data state associated with the connection in order to continue processing messages where a second server device associated with the second data communications device, that was formerly processing messages, stopped processing the messages. Accordingly, rapid transmission of such files is possible, as if no disruption of the second data communications device, second server device or the associated network facilities used for the earlier transmission had actually occurred.

In another embodiment, the first data communications device receives offset information identifying an offset created during establishment of the connection through the second data communications device. The first data communications device also modifies the message using the offset to allow the first data communications device to compensate for connection establishment performed by the second data communications device. Accordingly, the first data communications device can maintain a connection and forward messages to/from a client device even in the case where the second data communications device had spoofed the client device into acting as if a connection had already been established, so that the client would transmit the remainder of the client request.

Other embodiments of the invention may also include a computer system, such as a data communications device, computerized device, or other device configured with software and/or circuitry to process and perform all of the method operations noted above and disclosed herein as embodiments of the invention. In such embodiments, the device, such as a data communications device, may comprise one or more communications interfaces (e.g., network interfaces), a memory (e.g., any type of computer readable medium, storage or memory system), a processor and an interconnection mechanism connecting the communications interface, the processor and the memory. In such embodiments, the memory system is encoded with a connection handler application that when performed on the processor, produces a connection handler process that causes the computer system to perform any and/or all of the method embodiments, steps and operations explained herein as embodiments of the invention. In other words, a computer, switch, router or other device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured to operate as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other device to cause such a device to perform the techniques explained herein as embodiments of the invention.

Embodiments of the invention also include computer program products such as disks, or other readable media that have a computer-readable medium including computer program logic encoded thereon for controlling transmission of stream data between the client and stream servers in a networked computer environment, such that the computer program logic, when executed on at least one processing unit with the computerized device, causes the at least one processing unit to perform any or all of the aforementioned methods.

The methods embodiments of the invention may be implemented by computer software and/or hardware mechanisms within a data communications device apparatus. It is to be understood that the system of the invention can be embodied strictly as a software program, as software and hardware, or as hardware alone. The features of the invention, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques and mechanisms for accessing multiple server devices sharing the same network address. As an example embodiment of the invention, a first data communications devices can receive connection vector information from a second data communications which will allow the first data communications device to forward a message (e.g., such as a client request) to a server device, thereby accomplishing the same objective as would have been possible if the message had been able to be transmitted through the second data communications device which may have failed for some reason. The information provided by the connection vector may include network address translation information, data state offset information, content information and/or second server device identity information.

The first data communications device may either tunnel its messages to the second data communications device if the second data communications device is still operational, or may forward the message directly to a server device associated with the second data communications device or may forward the message to an altogether different server device.

Figure 1:
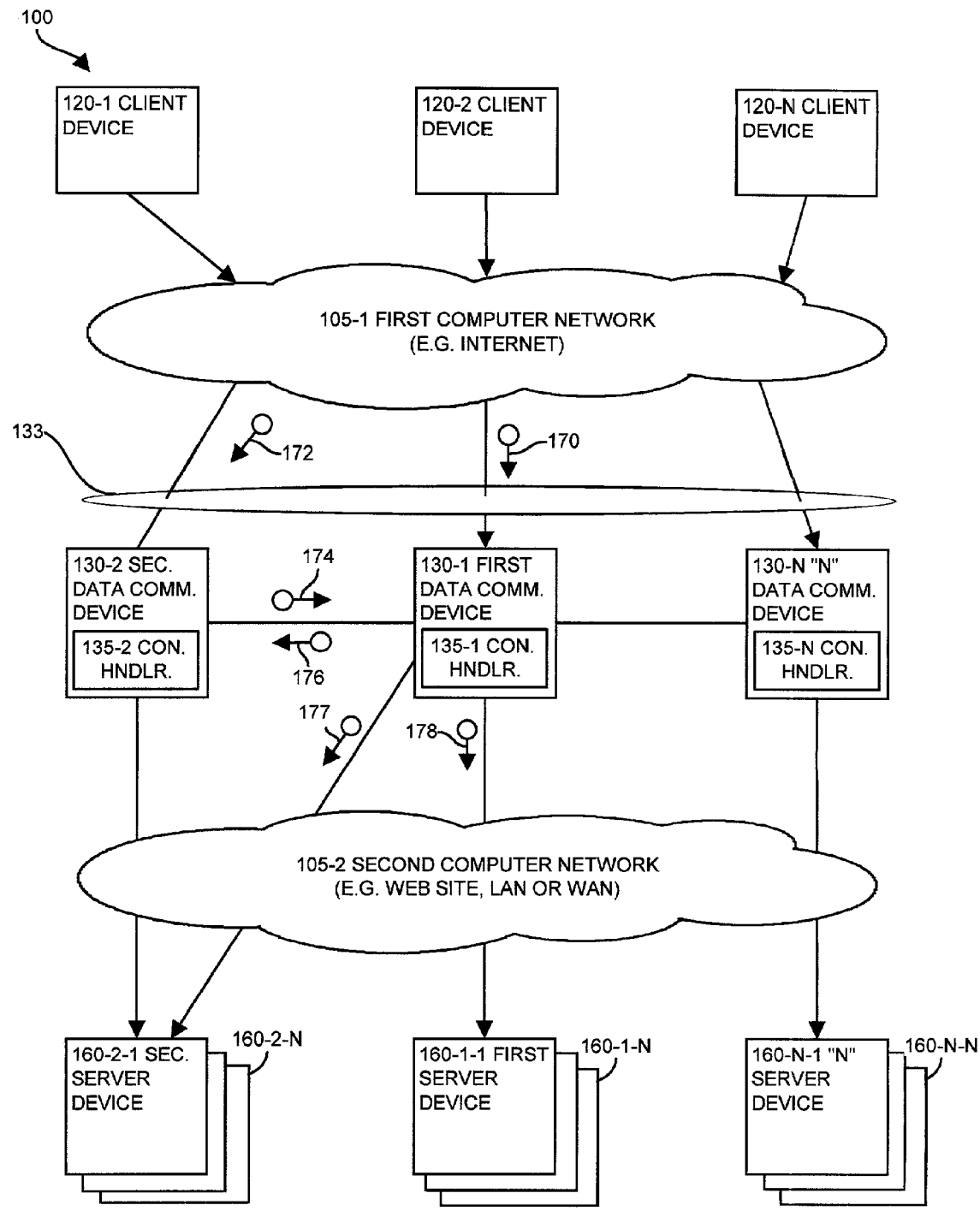
FIG. 1 illustrates a computer network environment 100 suitable for use in explaining example operations of embodiments of the invention.

FIG. 1 illustrates a computer network environment 100 suitable for use in explaining example operations of embodiments of the invention. The computer network environment includes multiple client devices 120, data communications devices 130 and server devices 160. The client devices 120 and data communications devices 130 are connected via first a computer network 105-1 (e.g., the Internet). The data communications devices 130 are connected with the server devices by a second computer network 105-2 (e.g., a web site, LAN, or WAN). The figure depicts the possible existence of multiple client device's 120-1 through 120-N. There may also be multiple data communications devices 130-1 through 130-N including, in particular, a first data communications device 130-1 and a second data communications device 130-2.

The multiple data communications devices 130 share a single network address 133 on the first computer network 105-1. As an example, on an interface coupling each data communication device 130 to the first computer network 105, each data communication device 130 may use the same IP address. The data communications devices 130 have connection handler modules 135-1 through 135-N which operate according to the techniques explained herein.

The figure also depicts the existence of multiple first server devices 160-1-1 through 160-1-N associated with the first data communications device 130-1 and multiple second server devices 160-2-1 through 160-2-N associated with the second data communications device 130-2. The figure also depicts messages 170, 172 (e.g., client requests) which, as shown, can be transmitted from one or more client devices 120, a tunneling message 176 transmitted from the first data communications device 130-1 to the second data communications device 130-2, a connection vector 174 transmitted from the second data communications device 130-2 to the first data communications device 130-1, a message transmitted directly from the first data communications device 130-1 to one of the second server devices 160-2 and a message 178 which is transmitted from the first data communications device 130-1 to one of the first server devices 160-1.

Figure 2:
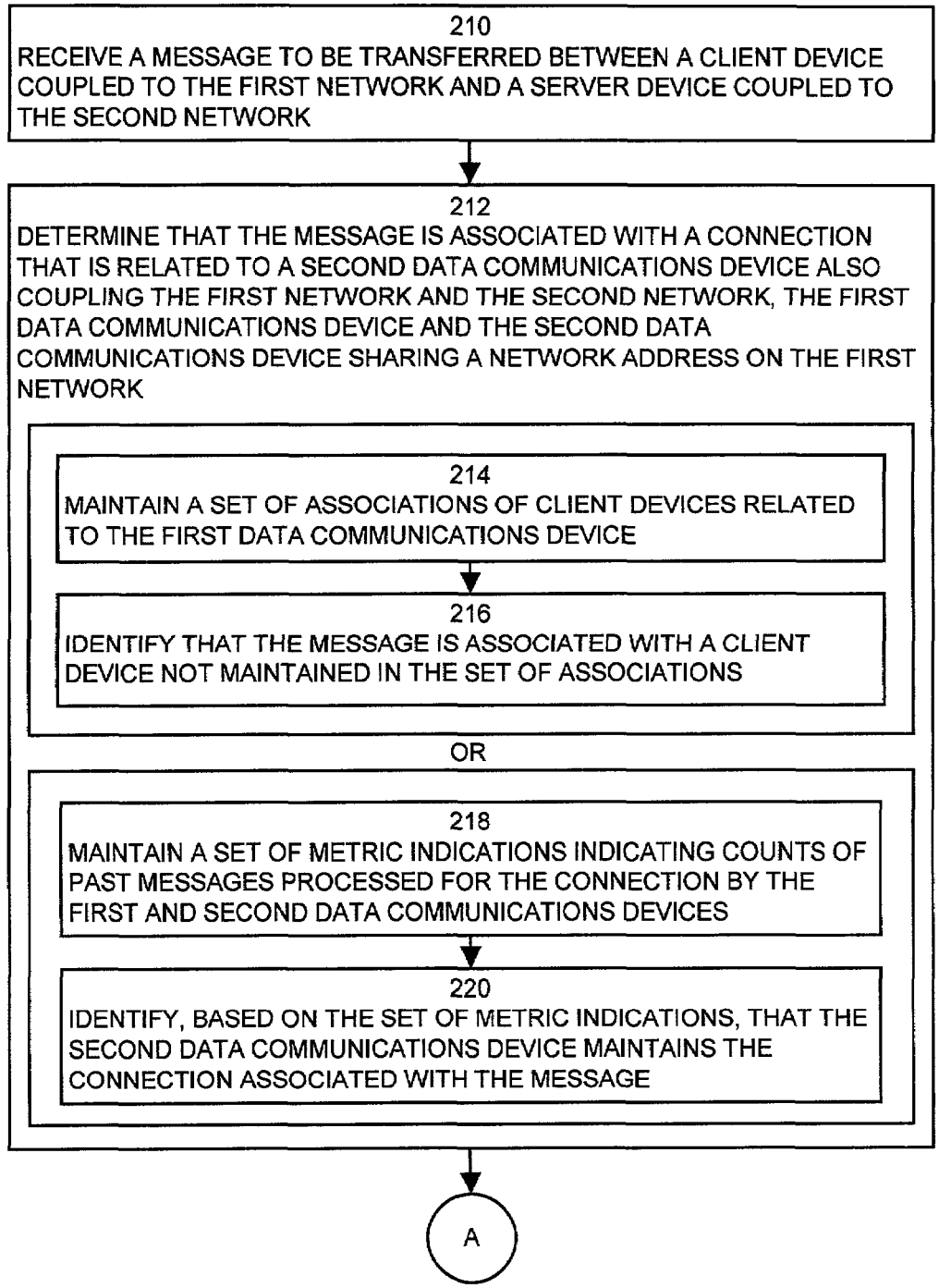
FIG. 2 is a partial flow chart 200 of a procedure for processing a message (e.g., a client request) as performed by the data communications device in one embodiment of the invention according to one embodiment of the invention.

Further details of the embodiments of the invention will now be provided with reference to FIG. 2.

Figure 3:
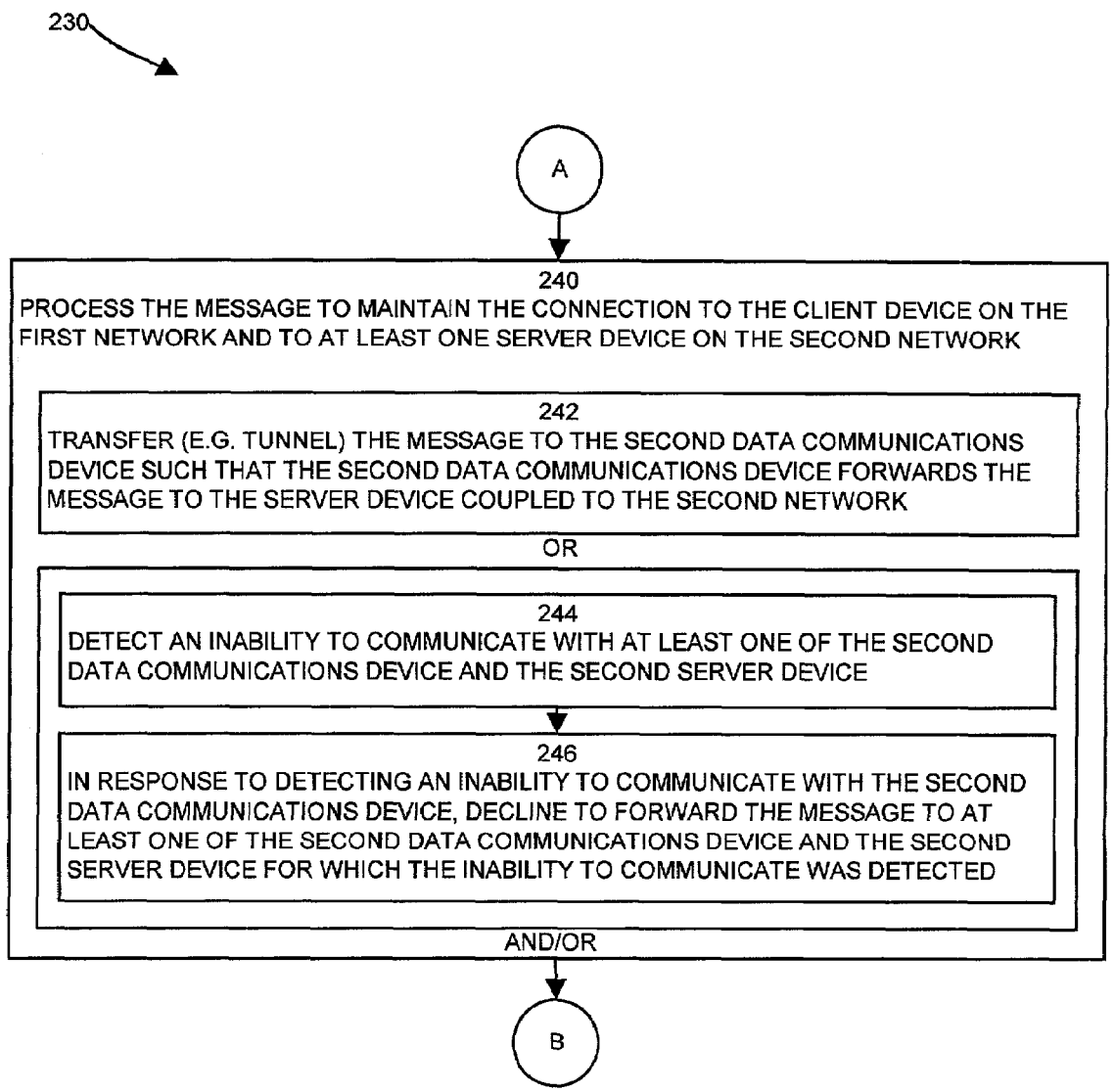
FIG. 3 is an flow chart 230 of additional steps of a procedure for processing a message as performed by the data communications device according to one embodiment of the invention.
Figure 4:
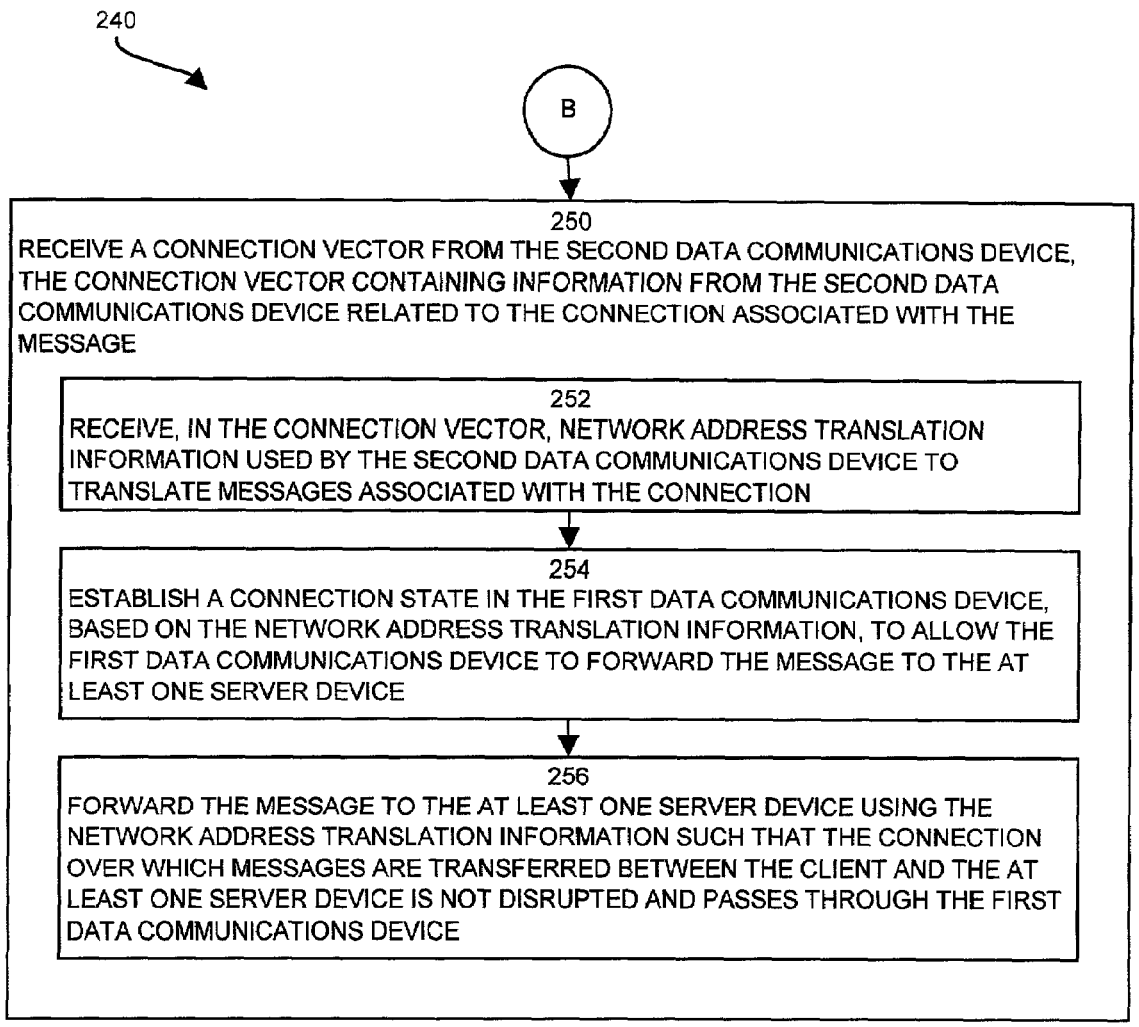
FIG. 4 is a flow chart 240 of a procedure for receiving and processing a connection vector received from a second data communications device by the first data communications device as performed in one embodiment of the invention.

FIGS. 2 through 4 provide a flow chart of a procedure for processing a message 170 (e.g., a client request) as performed by the first data communications device 130-1 according to one embodiment of the invention.

In step 210, the first data communications 130-1 device receives a message 170 (e.g., a client request) to be transferred between a client device 120 coupled to the first network 105-1 and a server device 160 coupled to the second network 105-2. The first data communications device 130-1 may receive the message 170, transmitted over the first computer network 105-1, from one of multiple of client devices 120.

In step 212, the first data communications device 130-1 determines that the message 170 is associated with a connection that is related to a second data communications device 130-2 also coupling the first network 105-1 and the second network 105-2. In this embodiment, the first data communications device 130-1 and the second data communications device 130-2 share a network address 133 on the first network 105-1. That is, the first data communications device 130-1 advertises the same network address 133 as other data communications devices 130 that are accessible to the first computer network 105-1. This shared address 133 may correspond, for example, to a web site of content accessible (i.e., servable) to each server device 160. Accordingly, various data communications devices 130 are able to receive such messages 170, 172 from client devices 120 and forward the content requests appropriately. Upon receipt of such a message 170, a first data communications device 130-1 identifies whether the message 170 (e.g., a client content request) is actually related or associated (as will be explained) to the second data communications device 130-2 (i.e., under other circumstances would have been transmitted to the second data communications device 130-2). Two example techniques that explain how such a device/message association can be made are shown in steps 214, 216 (a first example) and steps 218, 220 (a second example)

In step 214, the first data communications device 130-1 maintains a set of associations (See FIG. 5, 138) of client devices 120 related to the first data communications device 130-1. In one embodiment of the invention, the associations are a list of client devices 120 whose messages 170 are to be considered by the first data communications device 130-1 to be associated with the first data communications device 130-1 (i.e., rather than the second data communications device 130-2). In one example, each message 170 received, for which there is no entry in the set of associations 138, represents a message 170 for which the first data communications device 130-1 must obtain information, in order to process the message 170. The table can be organized in other ways, according to other embodiments of the invention, as well. For example, instead of a table based on client devices 120, the table could comprise a series of source-destination entries. Various other configurations of the set of associations are also possible.

In step 216, the first data communications device 130-1 identifies that the message 170 is associated with a client device 120, not maintained in the set of associations 138. Accordingly, messages from client devices 120 not found in the table of associations may be considered to not be associated with the first data communications device 130-1. For a message 170, received by the first data communications device 130-1, that is not associated with the first data communications device 130-1, the first data communications device 130-1 may require connection vector 174 information for processing and forwarding the message 170, as will be described in more detail later.

In an alternative embodiment, to detect that a message 170 received by a first data communications device 130-1 is associated with a connection related to a second data communications device 130-2, the connection handler 135-1 can perform steps 218 and 220.

In step 218, the first data communications device 130-1 maintains a set of metric indications 138 indicating counts of past messages 170 processed for the connection by the first and second data communications devices 130-1, 130-2. The set of metric indications 138 tracks whether the first data communications device 130-1 or second data communications device 130-2 is the preferred device for handling traffic based on past traffic patterns through either or both devices for messages associated with a connection. Metric indications may be, in one instance, essentially statistics tracking the quantities of messages 170 with different sources and/or destinations, etc. traveling through any particular data communications device 130 which are used to identify which data communications device 130 is a better candidate to handle later messages for a particular connection. Either the raw data to calculate metric indications or metric indications themselves may be exchanged between data communications devices 130. The metric indications 138 may be received by the first data communications device 130-1 from the second data communications device 130-2 and/or other data communications devices 130.

In step 220, the first data communications device 130-1 identifies, based on the set of metric indications 138, that the second data communications device 130-2 maintains the connection associated with the message 170.

FIG. 3 is an flow chart that continues the procedure for processing a message 170 as performed by the first data communications device 130-1 according to one example embodiment of the invention.

In step 240, the first data communications device processes the message 170 to maintain the connection to the client device 120 on the first network 105-1 and to at least one server device 160 on the second network 105-2.

The first data communications device 130-1 may receive a message 170 as a result of a failure of the second data communications device 130-2, the second server device, or as a result of a change in routing conditions in the first network 105. The first data communications device 130-1 has several options for continuing to process messages 170 from the point at which transmission of the message 170 was routed to the first data communications device 130-1. However, regardless of the ultimate replacement path that the first data communications device 130-1 uses to processes the remainder of the messages 170, the first data communications device 130-1 is able to maintain the existing connection with a client device 120 and process the remaining messages 170.

Step 242 shows one technique for processing the message 170. In step 242, the first data communications device transfers (e.g., tunnels) the message 170 to the second data communications device 130-2 such that the second data communications device 130-2 forwards the message 170 to the server device 160 coupled to the second network 105-2. For example, upon receipt of a message 170 from a client device 120 (step 210) which the first data communications device 130-1 determines is associated with the second data communications device 130-2 (step 212), the first data communications device 130-1 may tunnel that message 170 (step 242) and succeeding messages 170 to the second data communications device 130-2 for transfer to one of the second server devices 160-2-N. In effect, although earlier messages 170 between a client device 120 and the second server device 160-2, in this example, were processed through the second data communications device 130-2 before a change to routing conditions in the network path connected with the second data communications device 130-2 and the client 120, the messages 170 transmitted after the routing change is processed through the first data communications device 130-1 which, in turn, tunnels them back to the second data communications device 130-2 via an alternate path in the first network 105-1 (or via a dedicated channel) for eventual receipt by the second server device 160-2. Accordingly messages 170 are able to travel between the client device 120 and the second server device 160-2-N except that the later messages 170 travel over a different path after the occurrence of such a network 105-2 failure.

Step 244 illustrates an alternate embodiment for processing messages. In step 244, the first data communications device 130-1 detects an inability to communicate with at least one of the second data communications device 130-2 and/or the second server device 160-2. A variety of configurations of the system are possible by which the first data communications device 130-1 can be informed that either the second data communications device 130-2 or the second server device 160-2 have become inoperable and thus would be unable to process messages 170 received from the second data communications device 130-2. For example, in one case, a separate communications channel between the devices might be used to inform the first data communications device 130-1 of such a failure.

In step 246, in response to detecting an inability to communicate with the second data communications device 130-2, the first data communications device 130-1 declines to forward the message 170 to either the second data communications device 130-2 or the second server device 160-2 for which the inability to communicate was detected. The inability to communicate to either device may be based on a failure or routing changes of the first or second communications networks 105-1, 105-2 and/or the second data communications device server device 160-2. It may also represent such other situations as inoperable conditions caused by overloading or other problems. Declining to forward may include dropping messages 170. If the condition causing the messages 170 to be routed to the first data communications device 130-1 is short-lived or transient, it may correct itself and thus this embodiment provides that the first data communications device 130-1 drop packets 170 in the hope that the routing condition will correct itself.

FIG. 4 is a flow chart continuing the procedure for processing a message 170.

In step 250, the first data communications device 130-1 receives a connection vector 174 from the second data communications device 130-2. The connection vector 174 contains information from the second data communications device 130-2 related to the connection (e.g., an existing connection) associated with the message 170. The connection vector 174 may be requested from other data communications devices 130 on an as-needed basis when the first data communications device 130-1 identifies that it lacks information necessary for processing a message 170 associated with a second data communications device 130-2.

In another embodiment of the invention, the connection vector 174 is received from the second data communications device 130-2 prior to receipt of the message 170. Embodiments of the invention in which the connection vector 174 is received prior to receipt of the message 170 may include when a connection vector 174 is provided by the second data communications device 130-2 to the first data communications device 130-1 at the time of the reception of earlier messages 172 such as during an earlier establishment of a connection, on a periodic basis or on some other schedule. Other options for transmitting the connection vector 174 information to the first data communications device 130-1 are also possible.

An example of prior receipt of a connection vector 174 is the following. Upon initial receipt of a message 172 (i.e., such as a connection establishment request) from a client device 120, the second data communications device 130-2 internally establishes network address translation information for the message 172 and at that time forwards a connection vector 174 with this network address translation information to the first data communications device 130-1.

In these various ways, the first data communications device 130-1 is able to obtain connection vector 174 information from the second data communications device 130-2, in advance. Accordingly, the first data communications device 130-1 is able to have connection vector 174 information available even if a failure of the second data communications device 130-2 or a failure of a connection to the second data communications device 130-2 would otherwise have prevented the second data communications device 130-2 from sending the connection vector 174 to the first data communications device 130-1. The connection vector 174 information may be stored within the first data communications device 130-1 in one or more tables or other storage mechanism, for example, in order to be looked-up when needed.

Some other information provided by a connection vector 174 to a first data communications device 130-1 may include data state information 181, offset information 182, content information 183 and/or second server identity information 184. The purpose of each of these types of data received in the connection vector 174 will be explained shortly. The second data communications device 130-2 may be configured in such a fashion that it automatically sends the connection vector 174 to first data communications devices 130-1 at the same time that the second data communications device 130-2 receives any connection establishment messages 172.

In step 252, the first data communications device 130-1 receives, in the connection vector 174, network address translation information used by the second data communications device 130-2 to translate messages associated with the connection. Generally, the first data communications device 130-1 receives network address translation information from the second data communications device 130-2 in the connection vector 174 to translate message 170 header information within the message 170 in order to gain access to an appropriate server device 160.

Network address translation information 180, provided in the connection vector 174, is the information that may be used by the first data communications device 130-1 to perform network address translation on messages 170 received from the first computer network 105-1 to enable the messages 170 to be forwarded to one of various server devices 160. In order to perform network address translation, the first data communications device 130-1 replaces the shared address 133 that enabled the message 170 to reach the first data communications device 130-1 with an appropriate new address of a destination server device 160. The first data communications device 130-1 also replaces the source (e.g., of the client device) port number of the message header with an unused port number that will serve as a reference, later, to re-translate an address of the first data communications device 130-1 of a return message, received back from the server device 160, in response to a request message 170, and for translating addresses of future messages received by the first data communications device 130-1 with the same destination. A table is maintained by various of the data communications devices 130 to track connections which they have established for a predefined period of time. As will be explained in step 256 this process enables the first data communications device 130 to forward messages 170 which it has received based on use of the shared network address 133 to multiple different server devices.

For example, a connection establishment message 172 from a certain client 120 might initially be routed through the second data communications device 130-2 as a consequence of the normal routing patterns. Thereafter, a routing condition within the first computer network 105-1 might cause a later message 170 to be routed to the first data communications device 130-1. As explained above, step 212 can be used to identify the data communications device (i.e., the first data communications device 130-1 or second data communications device 130-2) for which a connection for messages 170 and 172 has already been established. Accordingly, if the first data communications device 130-1 receives a message 170 associated with a connection for which another data communications device 130-2 is already forwarding messages 172, the first data communications device 130-1 (can use the connection vector 174 with the appropriate network address translation information 180 to perform network address translation to route the message 170 through itself to a server 160.

In addition to providing information for network address translation, the connection vector 174 may also include offset information 182 conveying sequence numbers of message 170 headers that the first data communications device 130-1 uses to also modify message 170 headers so that messages 170 forwarded to a server device 160 by the first data communications device 130-1 have the same sequence numbers as the messages 170 would have had if the messages 170 had not been re-routed via the first data communications device 130-1 midstream in a connection.

In step 254 using the connection vector 174, the first data communications device 130-1 establish a connection state in the first data communications device 130-1, based on the network address translation information 180, to allow the first data communications device 130-1 to forward the message 170 to the at least one server device 160. Details of steps 254 and 256 will be explained shortly with respect to FIG. 9.

In step 256, the first data communications device 130-1 forwards the message 170 to the at least one server device 160 using the network address translation information 180 such that the connection over which messages 170 are transferred between the client 160 and a selected server device 160 is not disrupted and now passes through the first data communications device 130-1. As discussed earlier, with respect to tunneling of messages 170, and as will be discussed in more detail later with respect to other options available to the first data communications device 130-1, the first data communications device 130-1 is able to forward messages 170 in such fashion between the client device 120 sending a message 170 (e.g., initiating a client request) and receiving content in response to the messages 170 and a selected server device 160 in order to maintain continuous transmission between the devices as if the messages 170 transmitted had continued to be transmitted over the same path as the transmission had initially begun (e.g., messages 172 through the second data communications device 130-2).

Figure 5:
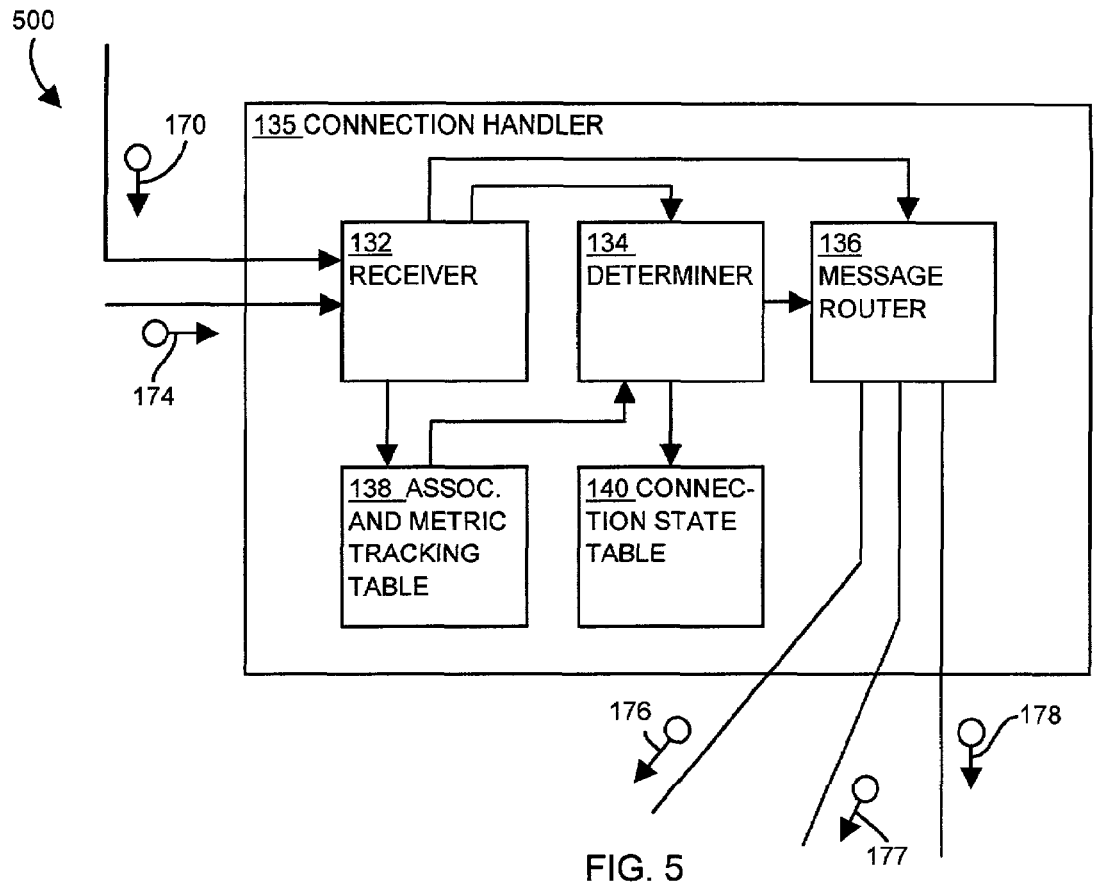
FIG. 5 is an example of components of the connection handler according to one embodiment of the invention.

Further details of the embodiments of the invention will now be provided with reference to FIG. 5.

FIG. 5 illustrates an example of components of the connection handler 135 according to one embodiment of the invention. The connection handler 135 includes a receiver 132, a determiner 134, a message 170 router 136, an associations and metric tracking table 138 and a connection state table 140. The figure also illustrates receiving a message 170 (e.g., a content request) and, a connection vector 174, and transmitting a message 176 (i.e., tunneled to the second data communications device 130-2), a message 177 (i.e., transmitted directly to the original second server device 160-2 for the connection) and a message 178 (i.e., forwarded to a newly selected first server device 160-1).

Figure 6:
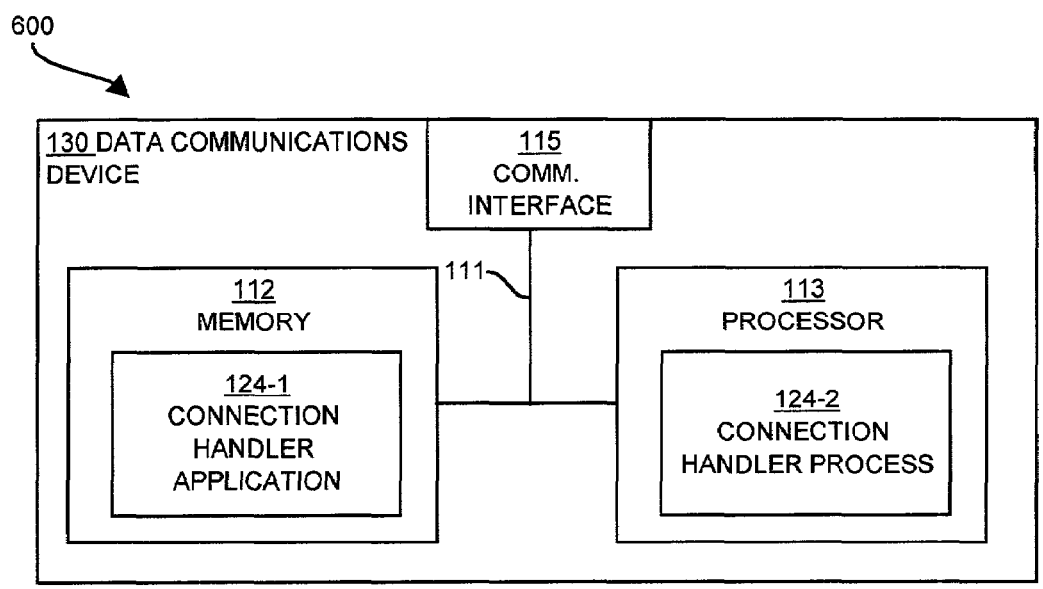
FIG. 6 is an example of a general purpose computer implementation according to one embodiment of the invention.

Further details of the embodiments of the invention will now be provided with reference to FIG. 6.

FIG. 6 illustrates an example of a general purpose data communications device implementation configured according to one embodiment of the invention. The example data communications device 130 includes an interconnection mechanism 111 (e.g., a data bus and/or circuitry) which couples a memory 112 (e.g., any computer readable medium such as random access memory (RAM) and/or read only memory (ROM) or even a disk or storage medium) having a connection handler application 124-1, a processor 113 (e.g., a microprocessor or central processing unit) having a connection handler process 124-2 and a communications interface 115 (e.g., network interface). The communications interface 115 allows the data communications device to communicate with the client devices 120, other data communications devices 130 and server devices 160 via multiple networks 105.

The memory 112 is encoded with logic instructions and/or data that forms a connection handler application 124-1 configured according to the embodiments of the invention which operates a connection handler process 124-2 in the processor 113.

Figure 7:
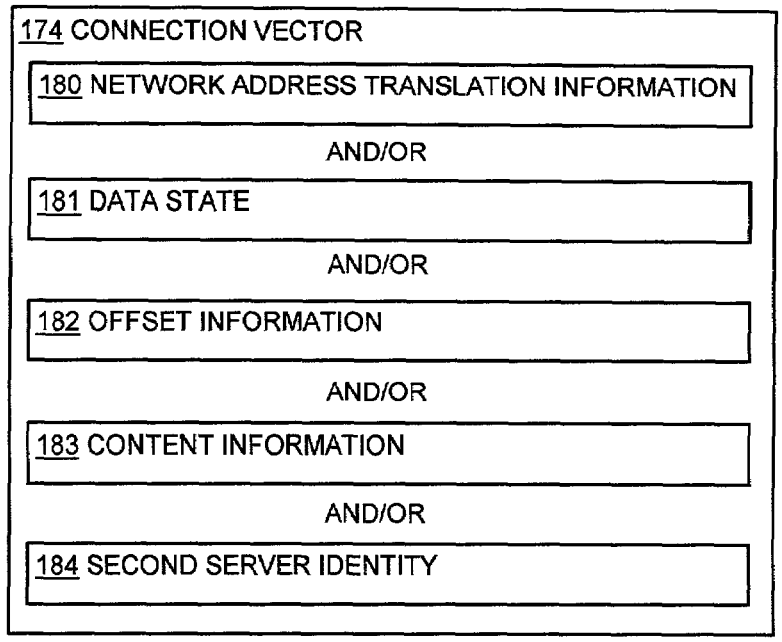
FIG. 7 shows various components of information stored in a connection vector according to one embodiment of the invention.

Further details of the embodiments of the invention will now be provided with reference to FIG. 7.

FIG. 7 shows various components of information stored in a connection vector 174 according to one example embodiment of the invention.

The connection vector 174 may include network address translation information 180, data state information 181, offset information 182, content information 183 and/or a second server identity 184. The connection vector 174 may include any, all or a combination of the data, as depicted, for use by the first data communications device 130-1. Further details about utilization of the connection vector information is provided in the detailed description of procedures for using the connection vector 174 information as described herein.

Figure 8:
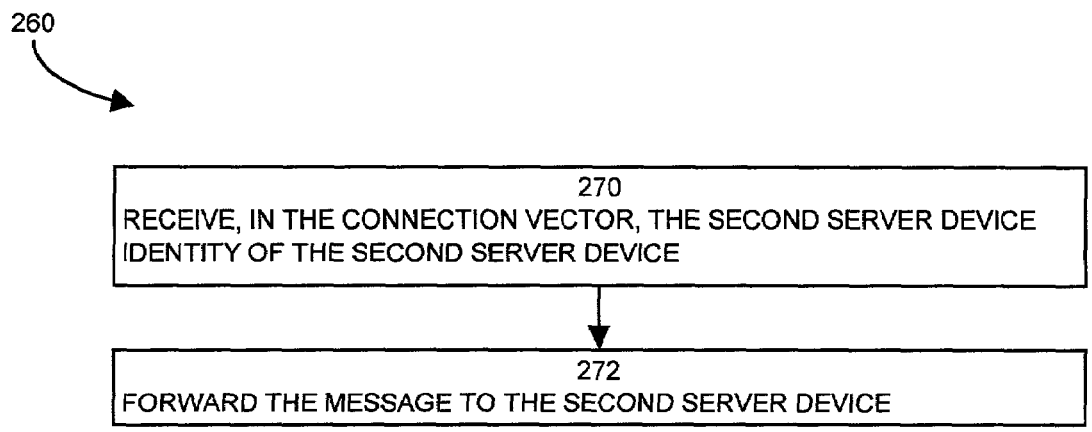
FIG. 8 is a flow chart 260 of a procedure for forwarding a message to one of the second server devices according to one embodiment of the invention.

Further details of the embodiments of the invention regarding the processing of step 256 (FIG. 4) will now be provided with reference to FIG. 8.

FIG. 8 is a flow chart 260 of a procedure for forwarding a message 170 (step 256 in FIG. 4) to one of the second server devices 160-2 according to one embodiment of the invention.

In step 270, the first data communications device 130-1 receives, in the connection vector 174, the second server device identity 184 of the second server device 160-2. If either the second data communications device 130-2 or the network 105-2 between the second data communications device 130-2 and the second server device 160-2 are not operational, the first data communications device 130-1 may elect to forward messages 170 to the second server device 160-2 which would otherwise have received the same message 170 if the message 170 had been forwarded by the second data communications device 130-2.

In one embodiment of the invention, the identity of such a second server device 160-2 (e.g., an address such as an IP address) may actually be obtained from the second data communications device 130-2 within the connection vector 174. Other options are also possible, by which the first data communications device 130-1 may access the second server device identity 184, such as, for example, by accessing a pre-established table of second server device identities 184 located on the first data communications device 130-1.

In step 272, the first data communications device 130-1 then forwards the message 170 to the second server device 160-2.

Figure 9:
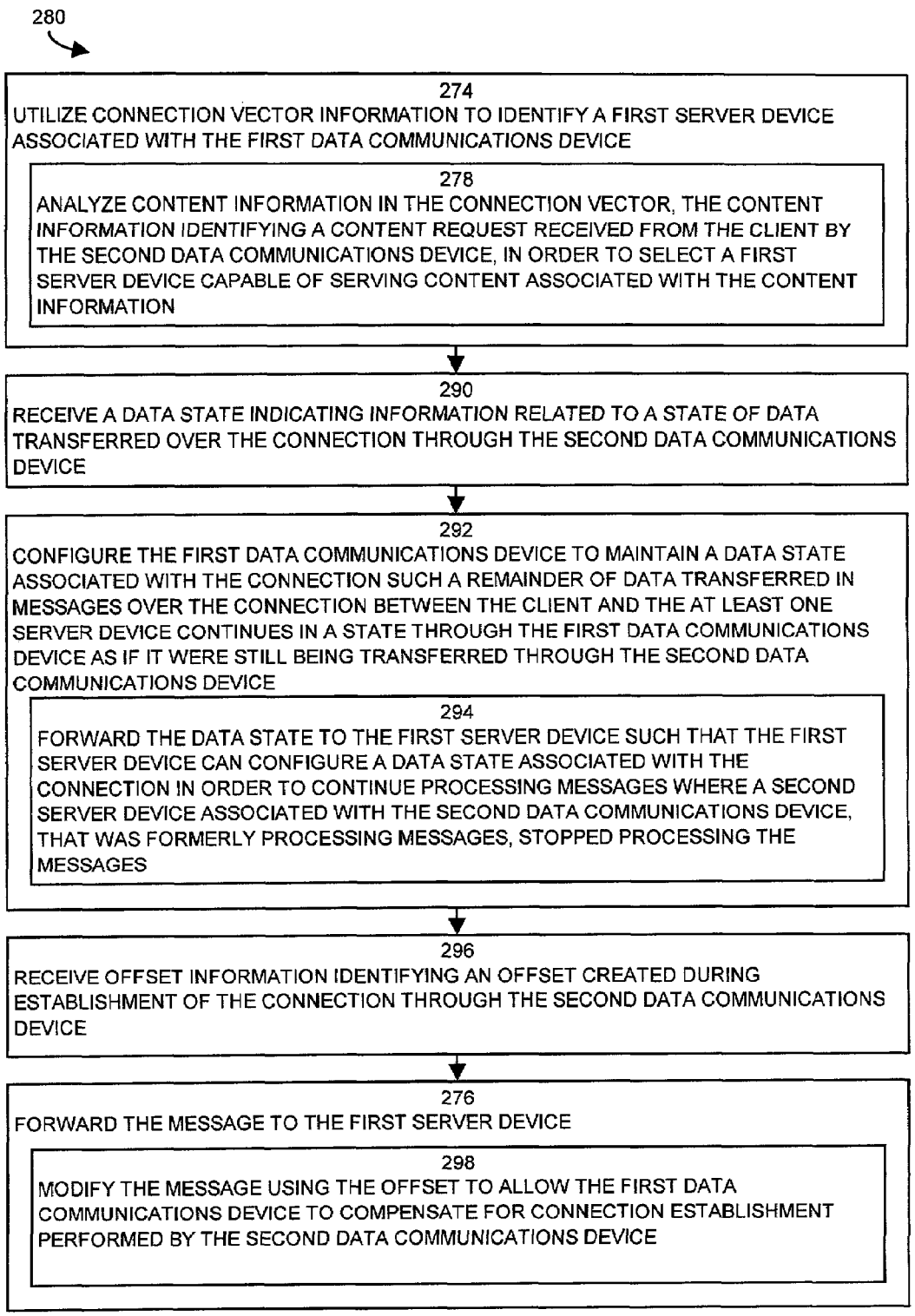
FIG. 9 is a flow chart 280 of a procedure for utilizing connection vector information in connection with transmitting messages to a first server device or second server device according to one embodiment of the invention.

Further details of the invention regarding another example embodiment of steps 254 and 256 from FIG. 4 will now be provided with reference to FIG. 9.

FIG. 9 is a flow chart 280 of a procedure for utilizing connection vector 174 information in connection with transmitting messages 170 to a first server device 160-1 or second server device 160-2 according to one embodiment of the invention.

In step 274, the first data communications device 130-1 utilizes connection vector information 174 to identify a first server device 160-1 associated with the first data communications device 130-1. In cases where the first data communications device 130-1 will be forwarding a message 170, to a first server device 160-1 to which the first data communications device 130-1 is associated, the first data communications device 130-1 may utilize elements of connection vector 174 information to process a message 170.

As described earlier, the connection vector 174 information may either be provided to the first data communications device 130-1 prior to the first data communications device's 130-1 reception of a message 170 such as in connection with prior messages 172 (e.g. initially received by the second data communications device 130-2) or on a periodic or scheduled basis or in response to a request from the first data communications device 130-1 initiated at the time of reception of a message 170.

In step 278, the first data communications device 130-1 analyzes content information 183 in the connection vector 174. The content information 183 identifies a content request 170 received from the client 120 by the second data communications device 130-2. This is done in order to select a first server device 160-1 capable of serving content associated with the content information 183. For example, in one case, the content information 183 provided to the first data communications device 130-1 within the connection vector 174 by the second data communications device 130-2, may actually be the URL of an initial content request transmitted by the client device 120. The first data communications device 130-1 may analyze the URL as part of making a determination as to which first server device 160-1 is the best server device 160-1 for providing requested content to the client 120. For example, such a URL may include parameter information that can be used to decide which of multiple first server devices 160-1 is preferred for providing the requested content. In another example, the URL, itself, may provide insight to the specific content requested that the first data communications device 130-1 can analyze and use to determine which is the preferred first server device 160-1 for providing requested content. As an example, the URL may indicate that audio data is being requested and thus an audio server can be selected.

In step 290, the first data communications device 130-1 receives a data state 181 indicating information related to a state of data transferred over the connection through the second data communications device 130-2. The data state 181 may indicate, for example, where, in a stream of data the second data communications device 130-2 was transferring, prior to stream acknowledgement messages 170 being re-routed to the first data communications device 130-1.

In step 292, the first data communications device 130-1 configures the first data communications device 130-1 to maintain a data state 184 associated with the connection such that a remainder of data transferred in messages 170 over the connection between the client 120 and the at least one server device 160 continues in a state through the first data communications device 130-1 as if it were still being transferred through the second data communications device 130-2.

For example, the second server device 160-2 may provide a streaming video file, in response to a request by a client device 120 via a path through the second data communications device 130-2. If message 172 transmission through the second data communications device 130-2 became impossible as a result of an equipment failure, during the course of transmission of the video file, the first data communications device 130-1 may obtain a data state information 184 from a connection vector 174 provided by the second data communications device 130-2 informing the first data communications device 130-1 as to the point in the video file which the second data communications device 130-2 stopped forwarding video file messages 174. With this information (i.e., the data state 184 information of the already progressing video file transmission), the first data communications device 130-1 re-starts transmission of the requested video file at the point where transmission of the video file was interrupted by failure of the second data communications device 130-2. In other words, the first data communications device 130-1, in turn, is now able to process messages 170 for the client's connection to a different server 160-1 from where it left off. In this way, the first data communications device 130-1 maintains a connection to the client device 120 with the initial portion of the video file being provided by the second server device 160-2 and the latter portion of the video file being provided by the first server device 160-1.

Step 292 may include communicating information to the server 160-1 to allow it to "pick-up" where the server 160-2 left off. In particular, in step 294, the first data communications device 130-1 forwards the data state 181 to the first server device 160-1 such that the first server device 160-1 can configure a data state 181 associated with the connection in order to continue processing messages 170 where a second server device 160-2 associated with the second data communications device 130-2, that was formerly processing messages 170, stopped processing the messages 170. This method provides that the data state 181 information is forwarded to the first server device 160-1 by the first data communications device 130-1 and the first server device 160-1 makes a determination of where to continue processing a request, for example, such as a requested streaming video file, rather than relying on the first data communications device 130-1 to make that determination.

In step 296, the first data communications device 130-1 receives offset information 182 identifying an offset 182 created during establishment of the connection through the second data communications device 130-2. In certain situations, a second data communications device 130-2 might spoof an acknowledgment to a client device 120 in order to obtain the URL of the content request message 172 during initial connection setup. Accordingly, the first data communications device 130-1 receives offset information 182 between the initial and later messages 172 that were initially sent to the second data communications device 130-2 and later sent to the first data communications device 130-1.

In step 276, the first data communications device 130-1 forwards the message 170 to the first server device 160-1. If offset information was received in step 266, then step 298 is performed.

In step 298, the first data communications device 130-1 modifies the message 170 using the offset 182 to allow the first data communications device 130-1 to compensate for connection establishment performed by the second data communications device 130-2. The first data communications device 130-1 uses the offset information 182 in order to forward messages 170 having sequence numbers that are the same as the sequence numbers that would have existed if transmission of messages 170 were still sent to and from the client device 120 and the second data communications device 130-2.

While this invention has been particularly shown and described with references to preferred embodiments thereof, it will be understood by those skilled in the art that various changes in form and details may be made therein without departing from the spirit and scope of the invention as defined by the appended claims.

For example, the embodiments of the invention, as described heretofore, are described in terms of a first and second data communications devices 130 and server devices 160. It should be understood, that more than one device of each type could perform the functions as described herein in a variety of configurations. It is further to be understood that the network environment, as described, may also operate with multiple client devices 120, as well.

In addition, it should be understood that the configuration of components of various embodiments of the invention can vary from those, as described herein. For example, data communications devices can be routers, bridges, switches, access servers, gateways, hubs, concentrators, proxy servers, repeaters and so forth which exchange data over an interconnection of data links. These may be physical connections or may also be provided using wireless communication mechanisms. On the low end they may also be as simple as wire connections between two devices.

Various physical or hardware data communications connection mechanisms allow devices to interconnect with network 105. Physical data communications connection mechanisms can include modems, transceivers, network interface cards, fiber optic cards, ports and other hardware devices and many others which allow data to be transferred at various data transfer rates (i.e., bandwidth) to and from various devices. For example, certain devices may have high speed network interfaces which provide connections to the network at high data rate such as fractional—T1, T1, E1 or higher, while other devices may use an inexpensive modem that provides a maximum data transfer rate of 56.6 kilobits per second (Kbps), more or less, to and from the network.

What is claimed is:

1. In a first data communications device coupling a first network and a second network, a method for processing messages to be transferred from the first network to the second network, the method comprising the steps of:
    receiving a message to be transferred between a client device coupled to the first network and a server device coupled to the second network;
    determining that the message is associated with a connection that is related to a second data communications device also coupling the first network and the second network, the first data communications device and the second data communications device sharing a network address on the first network; and
    processing the message to maintain the connection to the client device on the first network and to at least one server device on the second network, processing further including receiving a connection vector from the second data communications device, the connection vector containing information from the second data communications device related to the connection associated with the message, the step of processing further comprising:
        receiving, in the connection vector, network address translation information used by the second data communications device to translate messages associated with the connection;
        establishing a connection state in the first data communications device, based on the network address translation information, to allow the first data communications device to forward the message to the at least one server device; and
        forwarding the message to the at least one server device using the network address translation information such that the connection over which messages are transferred between the client and the at least one server device is not disrupted and passes through the first data communications device.

2. The method of claim 1 wherein the step of determining comprises the steps of:
    maintaining a set of associations of client devices related to the first data communications device; and
    identifying that the message is associated with a client device not maintained in the set of associations.

3. The method of claim 1 wherein the step of determining comprises the steps of:
    maintaining a set of metric indications indicating counts of past messages processed for the connection by the first and second data communications devices; and
    identifying, based on the set of metric indications, that the second data communications device maintains the connection associated with the message.

4. The method of claim 1 wherein the step of processing comprises the steps of:
    transferring the message to the second data communications device such that the second data communications device forwards the message to the server device coupled to the second network.

5. The method of claim 1, wherein the second data communications device maintains the connection between the client device and a second server device coupled to the second network, wherein the step of processing includes the steps of:
    detecting an inability to communicate with at least one of the second data communications device and the second server device; and
    in response to detecting an inability to communicate with the second data communications device, declining to forward the message to at least one of the second data communications device or the second server device for which the inability to communicate was detected.

6. The method of claim 1 wherein the connection vector received from the second data communications device, is received prior to receipt of the message.

7. The method of claim 1 wherein the connection vector includes at least one of:
    i) network address translation information used by the second data communications device to translate messages associated with the connection;
    ii) a data state indicating information related to a state of data transferred over the connection through the second data communications device;
    iii) offset information identifying an offset created during establishment of the connection through the second data communications device;
    iv) content information identifying a content request received from the client by the second data communications device; or
    v) a second server device identity indicating a second server device to which the second data communications device forwards messages associated with the connection.

8. The method of claim 1 wherein the second data communications device maintains the connection between the client device and a second server device which is the at least one server device; and
    wherein the step of processing comprises the steps of:
        receiving, in the connection vector, the second server device identity of the second server device; and wherein the step of forwarding the message to the at least one server device comprises the step of forwarding the message to the second computer system.

9. The method of claim 1 wherein the second data communications device maintains the connection between the client device and a second server device, and wherein the step of processing comprises the step of:
  utilizing connection vector information to identify a first server device associated with the first data communications device; and
  wherein the step of forwarding the message to the at least one server device comprises the step of forwarding the message to the first server device.

10. The method of claim 9 wherein the step of utilizing connection vector information comprises the steps of:
  analyzing content information in the connection vector, the content information identifying a content request received from the client by the second data communications device, in order to select a first server device capable of serving content associated with the content information.

11. The method of claim 1 wherein the step of receiving the connection vector comprises the steps of:
  receiving a data state indicating information related to a state of data transferred over the connection through the second data communications device;
  configuring the first data communications device to maintain a data state associated with the connection such a remainder of data transferred in messages over the connection between the client and the at least one server device continues in a state through the first data communications device as if it were still being transferred through the second data communications device.

12. The method of claim 11 wherein the at least one server is a first server device associated with the first data communications device, and wherein the step of configuring the first data communications device to maintain a data state associated with the connection comprises the steps of:
  forwarding the data state to the first server device such that the first server device can configure a data state associated with the connection in order to continue processing messages where a second server device associated with the second data communications device, that was formerly processing messages, stopped processing the messages.

13. The method of claim 1 wherein the step of receiving the connection vector comprises the steps of:
  receiving offset information identifying an offset created during establishment of the connection through the second data communications device;
  and wherein the step of forwarding the message to the at least one server device comprises:
  modifying the message using the offset to allow the first data communications device to compensate for connection establishment performed by the second data communications device.

14. In a first data communications comprising:
a communications interface;
a memory;
a processor; and
an interconnection mechanism coupling the communications interface, the memory and processor;
wherein the memory is configured with a connection handler application, that when performed on the processor processes messages to be transferred from a first network to a second network by performing the operations of:

receiving a message to be transferred between a client device coupled to the first network and a server device coupled to the second network;
determining that the message is associated with a connection that is related to a second data communications device also coupling the first network and the second network, the first data communications device and the second data communications device sharing a network address on the first network; and
processing the message to maintain the connection to the client device on the first network and to at least one server device on the second network, further including:
  receiving a connection vector from the second data communications device, the connection vector containing information from the second data communications device related to the connection associated with the message
  receiving, in the connection vector, network address translation information used by the second data communications device to translate messages associated with the connection;
  establishing a connection state in the first data communications device, based on the network address translation information, to allow the first data communications device to forward the message to the at least one server device; and
  forwarding the message to the at least one server device using the network address translation information such that the connection over which messages are transferred between the client and the at least one server device is not disrupted and passes through the first data communications device.

15. The first data communications device of claim 14 wherein, when the first data communications device performs the operation of determining the first data communications device performs the operations of:
  maintaining a set of associations of client devices related to the first data communications device; and
  identifying that the message is associated with a client device not maintained in the set of associations.

16. The first data communications device of claim 14 wherein when the first data communications device performs the operation of determining the first data communications device performs the operations of:
  maintaining a set of metric indications indicating counts of past messages processed for the connection by the first and second data communications devices; and
  identifying, based on the set of metric indications, that the second data communications device maintains the connection associated with the message.

17. The first data communications device of claim 14 wherein when the first data communications device performs the operation of processing the first data communications device performs the operations of:
  transferring the message to the second data communications device such that the second data communications device forwards the message to the server device coupled to the second network.

18. The first data communications device of claim 14, wherein the second data communications device maintains the connection between the client device and a second server device coupled to the second network and wherein when the first data communications device performs the operation of processing the first data communications device performs the operations of:

detecting an inability to communicate with at least one of the second data communications device and the second server device; and in response to detecting an inability to communicate with the second data communications device, declining to forward the message to at least one of the second data communications device or the second server device for which the inability to communicate was detected.

19. The first data communications device of claim 14 wherein the connection vector received from the second data communications device, is received prior to receipt of the message.

20. The first data communications device of claim 14 wherein the connection vector includes at least one of:
   i) network address translation information used by the second data communications device to translate messages associated with the connection;
   ii) a data state indicating information related to a state of data transferred over the connection through the second data communications device;
   iii) offset information identifying an offset created during establishment of the connection through the second data communications device;
   iv) content information identifying a content request received from the client by the second data communications device; or
   v) a second server device identity indicating a second server device to which the second data communications device forwards messages associated with the connection.

21. The first data communications device of claim 14 wherein when the second data communications device maintains the connection between the client device and a second server device which is the at least one server device; and
   wherein when the first data communications device performs the operation of processing the first data communications device performs the operation of:
   receiving, in the connection vector, the second server device identity of the second server device; and
   wherein when the first data communications device performs the operation of forwarding the message to the at least one server device the first data communications device performs the operation of forwarding the message to the second computer system.

22. The first data communications device of claim 14 wherein the second data communications device maintains the connection between the client device and a second server device, and wherein when the first data communications device performs the operation of processing the first data communications device performs the operation of:
   utilizing connection vector information to identify a first server device associated with the first data communications device; and
   wherein when the first data communications device performs the operation of forwarding the message to the at least one server device the first data communications device performs the operation of forwarding the message to the first server device.

23. The first data communications device of claim 22 wherein when the first data communications device performs the operation of utilizing connection vector information the first data communications device performs the operation of:
   analyzing content information in the connection vector, the content information identifying a content request received from the client by the second data communications device, in order to select a first server device capable of serving content associated with the content information.

24. The first data communications device of claim 14 wherein when the first data communications device performs the operation of receiving the connection vector the first data communications device performs the operation of:
   receiving a data state indicating information related to a state of data transferred over the connection through the second data communications device;
   configuring the first data communications device to maintain a data state associated with the connection such a remainder of data transferred in messages over the connection between the client and the at least one server device continues in a state through the first data communications device as if it were still being transferred through the second data communications device.

25. The first data communications device of claim 24 wherein the at least one server is a first server device associated with the first data communications device, and wherein when the first data communications device performs the operation of configuring the first data communications device to maintain a data state associated with the connection the first data communications device performs the operation of:
   forwarding the data state to the first server device such that the first server device can configure a data state associated with the connection in order to continue processing messages where a second server device associated with the second data communications device, that was formerly processing messages, stopped processing the messages.

26. The first data communications device of claim 14 wherein when the first data communications device performs the operation of receiving the connection vector the first data communications device performs the operation of:
   receiving offset information identifying an offset created during establishment of the connection through the second data communications device;
   and wherein the step of forwarding the message to the at least one server device comprises:
   modifying the message using the offset to allow the first data communications device to compensate for connection establishment performed by the second data communications device.

27. A first data communications device, for coupling a first network to a second network comprising:
   a memory;
   a communications interface;
   a processor;
   an interconnection mechanism coupling the memory, the processor and the communications interface;
   means, coupled to the communications interface, for receiving a message to be transferred between a client device coupled to the first network and a server device coupled to the second network;
   means, coupled to the processor, for determining that the message is associated with a connection that is related to a second data communications device also coupling the first network and the second network, the first data communications device and the second data communications device sharing a network address on the first network; and
   means, coupled to the processor, for processing the message to maintain the connection to the client device on the first network and to at least one server device on the second network, the means for processing further including:

means for receiving a connection vector from the second data communications device, the connection vector containing information from the second data communications device related to the connection associated with the message;

means for receiving, in the connection vector, network address translation information used by the second data communications device to translate messages associated with the connection;

means for establishing a connection state in the first data communications device, based on the network address translation information, to allow the first data communications device to forward the message to the at least one server device; and means for forwarding the message to the at least one server device using the network address translation information such that the connection over which messages are transferred between the client and the at least one server device is not disrupted and passes through the first data communications device.

28. In a first data communications device coupling a first network and a second network, a method for processing messages to be transferred from the first network to the second network, the method comprising the steps of:

receiving a message to be transferred between a client device coupled to the first network and a server device coupled to the second network;

determining that the message is associated with a connection that is related to a second data communications device also coupling the first network and the second network, the first data communications device and the second data communications device sharing a network address on the first network, determining further comprising the steps of:

maintaining a set of associations of client devices related to the first data communications device; and identifying that the message is associated with a client device not maintained in the set of associations; and processing the message to maintain the connection to the client device on the first network and to at least one server device on the second network, processing further comprising:

receiving a connection vector from the second data communications device, the connection vector containing information from the second data communications device related to the connection associated with the message receiving, in the connection vector, network address translation information used by the second data communications device to translate messages associated with the connection;

establishing a connection state in the first data communications device, based on the network address translation information, to allow the first data communications device to forward the message to the at least one server device;

forwarding the message to the at least one server device using the network address translation information such that the connection over which messages are transferred between the client and the at least one server device is not disrupted and passes through the first data communications device; and transferring the message to the second data communications device such that the second data communications device forwards the message to the server device coupled to the second network.

29. The method of claim 28 wherein the step of processing the message comprises the step of:

receiving a connection vector from the second data communications device, the connection vector containing information from the second data communications device related to the connection associated with the message, wherein the connection vector includes at least one of:

i) network address translation information used by the second data communications device to translate messages associated with the connection;

ii) a data state indicating information related to a state of data transferred over the connection through the second data communications device;

iii) offset information identifying an offset created during establishment of the connection through the second data communications device;

iv) content information identifying a content request received from the client by the second data communications device; or v) a second server device identity indicating a second server device to which the second data communications device forwards messages associated with the connection.

* * * * *